United States Patent
Poledna et al.

(10) Patent No.: US 8,204,037 B2
(45) Date of Patent: Jun. 19, 2012

(54) AUTOCRATIC LOW COMPLEXITY GATEWAY/ GUARDIAN STRATEGY AND/OR SIMPLE LOCAL GUARDIAN STRATEGY FOR FLEXRAY OR OTHER DISTRIBUTED TIME-TRIGGERED PROTOCOL

(75) Inventors: Stefan Poledna, Klosterneuburg (AT); Martin Schwarz, Vienna (AT); Guenther Bauer, Vienna (AT); Wilfred Steiner, Vienna (AT); Brendan Hall, Eden Prairie, MN (US); Michael Paulitsch, Columbia Heights, MN (US)

(73) Assignee: Honeywell International Inc., Morristown, NJ (US)

( * ) Notice: Subject to any disclaimer, the term of this patent is extended or adjusted under 35 U.S.C. 154(b) by 440 days.

(21) Appl. No.: 12/198,611

(22) Filed: Aug. 26, 2008

(65) Prior Publication Data

US 2009/0141744 A1 Jun. 4, 2009

Related U.S. Application Data

(60) Provisional application No. 60/968,492, filed on Aug. 28, 2007.

(51) Int. Cl.
*H04J 3/24* (2006.01)
(52) U.S. Cl. .......................... 370/350; 370/503
(58) Field of Classification Search .................. 370/252, 370/503, 258, 350
See application file for complete search history.

(56) References Cited

U.S. PATENT DOCUMENTS

| | | | | |
|---|---|---|---|---|
| 6,145,008 | A * | 11/2000 | Kopetz | 709/236 |
| 6,651,106 | B1 * | 11/2003 | Driscoll | 709/243 |
| 7,539,888 | B2 * | 5/2009 | Hu et al. | 713/324 |
| 7,586,954 | B2 * | 9/2009 | Hatanaka | 370/503 |
| 7,788,667 | B2 * | 8/2010 | Jiang | 718/102 |

(Continued)

OTHER PUBLICATIONS

Seiner et al.(the starup problem in fault-tolerant time-triggered communication); 2006; Computer Society; pp. 1-10.*

(Continued)

*Primary Examiner* — Ricky Ngo
*Assistant Examiner* — Dewanda Samuel
(74) *Attorney, Agent, or Firm* — Fogg & Powers LLC

(57) ABSTRACT

A special node is used in a distributed time-triggered cluster. The special node comprises protocol functionality to establish a time base to use in communicating with a plurality of end nodes and to source timing-related frames to the plurality of end nodes in accordance with the distributed time-triggered communication protocol. The protocol functionality establishes the time base without regard to any timing-related frame sourced from any of the plurality of end nodes. In one embodiment, the protocol functionality of the special node is implemented in a low complexity manner. In one embodiment, the cluster comprises a star topology and the special node performs at least one of semantic filtering and rate enforcement. In another embodiment, the cluster comprises a bus or peer-to-peer topology and each end node is coupled to the communication channel using a low-complexity special local bus guardian.

24 Claims, 8 Drawing Sheets

U.S. PATENT DOCUMENTS

| | | | |
|---|---|---|---|
| 2003/0154427 A1* | 8/2003 | Hermann et al. | 714/31 |
| 2005/0094674 A1* | 5/2005 | Zinke et al. | 370/507 |
| 2005/0129037 A1* | 6/2005 | Zumsteg et al. | 370/404 |
| 2005/0141524 A1* | 6/2005 | Hall et al. | 370/400 |
| 2005/0141565 A1* | 6/2005 | Forest et al. | 370/503 |
| 2005/0172167 A1* | 8/2005 | Driscoll et al. | 714/26 |
| 2005/0198280 A1* | 9/2005 | Hall et al. | 709/224 |
| 2005/0254518 A1* | 11/2005 | Fujimori | 370/466 |
| 2006/0045133 A1* | 3/2006 | Temple et al. | 370/498 |
| 2007/0116058 A1* | 5/2007 | Rausch et al. | 370/503 |
| 2010/0002594 A1* | 1/2010 | Elend | 370/252 |

OTHER PUBLICATIONS

"Flexray Communications System Protocol Specification Version 2.1 Revison A", Dec. 2005, pp. 1-245, Publisher: FlexRay Consortium.

"Flexray Communication System: Protocol Specification Version 2.1 Revision A Errata Sheet", "www.flexray-group.com", Mar. 2006, pp. 1-8, Publisher: Flexray Consortium.

* cited by examiner

AUTOCRATIC LOW COMPLEXITY GATEWAY/ GUARDIAN STRATEGY AND/OR SIMPLE LOCAL GUARDIAN STRATEGY FOR FLEXRAY OR OTHER DISTRIBUTED TIME-TRIGGERED PROTOCOL

CROSS-REFERENCE TO RELATED APPLICATIONS

This application claims the benefit of U.S. Provisional Application No. 60/968,492, filed on Aug. 28, 2007, which is incorporated herein by reference in its entirety.

BACKGROUND

As used here, the phrase "distributed time-triggered protocol" means a communication protocol that enables a group of nodes to communicate using a time division multiple access (TDMA) scheme where the nodes employ a distributed clock synchronization algorithm to synchronize their local clocks to one another. One example of a distributed time-triggered protocol is the FlexRay time-triggered protocol developed by the FlexRay Consortium and described in detail in the FlexRay Protocol Specification V2.1 Rev. A and Protocol Specification V2.1. Rev. A Errata V1, both of which are incorporated herein by reference in their entirety.

The FlexRay protocol, as specified in the V2.1 Rev. A specification, does not incorporate a mechanism to synchronize a cluster of FlexRay nodes to an external time-base.

In addition, the FlexRay protocol, as specified in the V2.1 Rev. A specification, has known dependency vulnerabilities, such as protocol failure during start-up.

Moreover, in domains such as aerospace where formal design assurance is expected (for example, in accordance with the Design Assurance Guidance for Airborne Electronic Hardware DO-254 standard published by RTCA, Incorporated) the feasibility and costs of certifying complex commercial intellectual property (IP) cores—such as FlexRay IP cores—comprise a significant risk. Although COTS certification arguments (for example, arguments for validation based on use) may be viable for standalone integrated circuits and IP cores integrated and produced in mass volume, in the aerospace domain where IP cores are often embedded into aerospace-specific custom designs, such arguments may be compromised.

SUMMARY

In one embodiment, a node comprises an interface to communicatively couple the node to a communication channel over which a plurality of end nodes communicate. The node further comprises protocol functionality to establish a time base to use in communicating with the plurality of end nodes and to source timing-related frames to the plurality of end nodes in accordance with a distributed time-triggered protocol. The protocol functionality establishes the time base without regard to any timing-related frame sourced from any of the plurality of end nodes.

In another embodiment, a cluster comprises a plurality of end nodes that communicate with one another over at least one communication channel using a distributed time-triggered communication protocol. The cluster further comprises a special node that communicates with the plurality of end nodes over the communication channel. The special node comprises protocol functionality to establish a time base to use in communicating with the plurality of end nodes and to source timing-related frames to the plurality of end nodes in accordance with the distributed time-triggered communication protocol. The protocol functionality establishes the time base without regard to any timing-related frame sourced from any of the plurality of end nodes.

In another embodiment, a node comprises a distributed time-triggered communication protocol controller, a bus driver to communicatively couple distributed time-triggered communication protocol controller to a communication channel, and local guardian functionality to enforce a schedule using an established time base. The local guardian functionality comprises functionality that enforces the schedule by counting a current time slot of the schedule and comparing frame identifiers of received frames with information from the schedule.

In another embodiment, a node comprises a distributed time-triggered communication protocol controller, a bus driver to communicatively couple distributed time-triggered communication protocol controller to a communication channel, and simple local guardian functionality that performs semantic filtering by truncating at least one of timing-related frames and startup-related frames that are sourced from a node other than a special node that is designated as the source of synchronization and/or startup frames.

The details of various embodiments of the claimed invention are set forth in the accompanying drawings and the description below. Other features and advantages will become apparent from the description, the drawings, and the claims.

DRAWINGS

Like reference numbers and designations in the various drawings indicate like elements.

DETAILED DESCRIPTION

Figure 1:
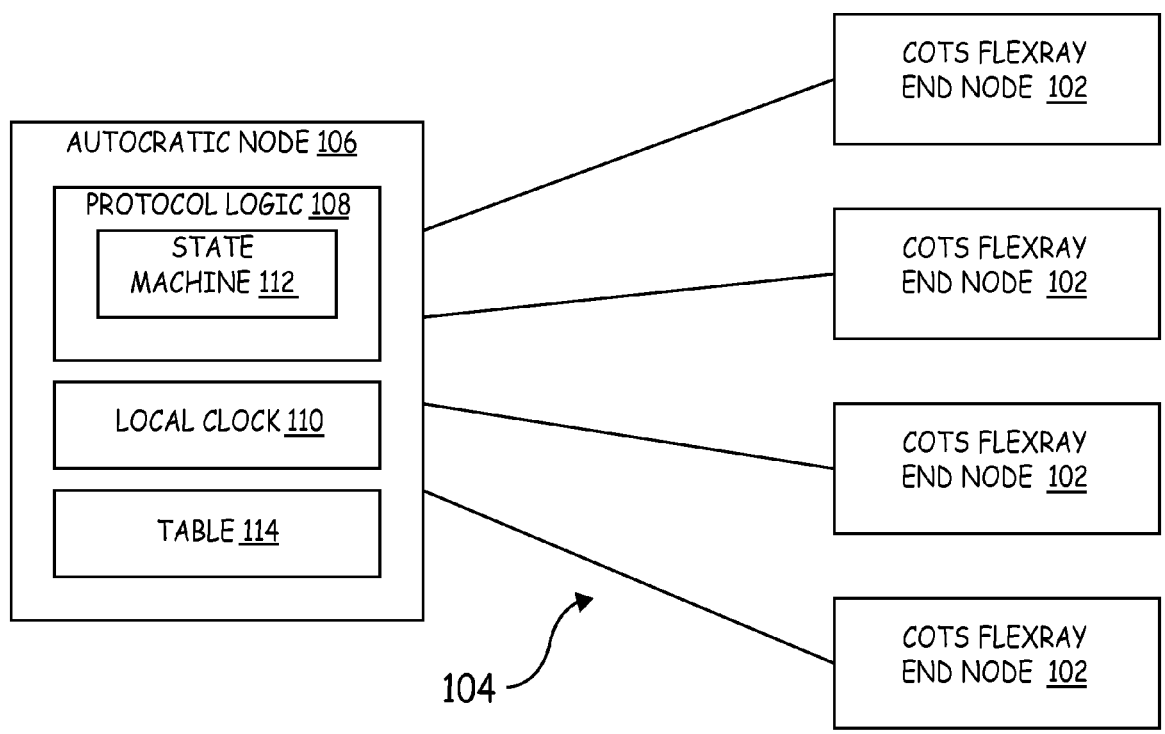
FIG. 1 is block diagram of one embodiment of a cluster having an autocratic node.

FIG. 1 is a block diagram of one embodiment of a cluster 100 of end nodes 102. In the particular embodiment shown in FIG. 1, the end nodes 102 communicate with one another over one or more communication channels 104 using a distributed time-triggered communication protocol (for example, the FlexRay protocol). The embodiment shown in FIG. 1 is described here as being implemented to support the FlexRay protocol using standard commercial off the shelf (COTS) FlexRay-compatible end nodes 102, though it is to be understood that, in other embodiments, other distributed time-triggered protocols can be used. In such an embodiment, each COTS FlexRay end node 102 typically comprises a host that executes application software that provides and uses the data that is communicated over the cluster 100. For example, in one implementation, the host is a microprocessor executing a safety-critical control application. The host communicates with the other end nodes 102 in the cluster 100 using a FlexRay protocol communication controller that implements FlexRay protocol logic (for example, FlexRay timing control, clock synchronization, and startup, error, and message handling). The COTS FlexRay end node 102 also typically comprises one or more bus drivers that couples the communication controller to the communication media that is used to implement the one or more communication channels 104 to which the end node 102 is coupled. Moreover, the end node 102 also comprises one or more conventional FlexRay bus guardians that monitor data that is transmitted on the communication channels 104 and only permits the end node 102 to transmit on the communication channel 104 during those time slots in which the end node 102 is scheduled to transmit.

In this embodiment, a "special" node 106 (also referred to here as "autocratic node" 106 or "AN" 106) sources all valid FlexRay timing-related and startup-related frames (for example, all FlexRay startup, integration, and synchronization protocol frames). The autocratic node 106 comprises a suitable interface 105 to communicatively couple the autocratic node 106 to the communication channel 104 over which the autocratic node 106 and the end nodes 102 communicate. Where the end nodes 102 are implemented using COTS FlexRay end nodes 102 that would otherwise source startup, integration, and synchronization frames, any such startup, integration, and synchronization frames that are sourced by the COTS end nodes 102 are prevented from successfully reaching any of the other end node 102 so that the only startup, integration, and synchronization frames that are successfully received by the end nodes 102 are those that are sourced from the autocratic node 106.

By sourcing all of the synchronization frames from the autocratic node 106, the other COTS FlexRay end nodes 102 that are coupled to the cluster 100 simply follow the time sourced from the autocratic node 106 in a conceptual master/slave fashion. It is noted that this master/slave property is achieved even though the COTS FlexRay end nodes 102 are themselves using the ordinary, standard peer-to-peer synchronization mechanism of the underlying FlexRay protocol. Also, as noted above, the autocratic node 106 sources all start-up and integration frames. Since this is the case, the FlexRay protocol implemented by the COTS end node 102 can also align the master time base of autocratic node 106 and with the local time lines of the end nodes 102 immediately on power-up. Hence the long convergence times of traditional, standard peer-to-peer synchronization approaches can be avoided.

In the particular embodiment shown in FIG. 1, the cluster 100 is implemented using a star topology in which the autocratic node 106 serves as an internetworking device that couples the end nodes 102 to one another. Each logical communication channel 104 is implemented using point-to-point communication links that couple each end node 102 to a respective port of the autocratic node 106 using a suitable physical communication medium or media (for example, using metallic or optical communication media). The autocratic node 106 comprises a plurality of ports 107 that are used to communicatively couple such point-to-point communication links (and the respective end node 102) to the autocratic node 106. Generally, in such an embodiment, the autocratic node 106 forwards each "valid" frame that is received by the autocratic node 106 from one of the end nodes 102 to a subset of the other end nodes 102 in the cluster 100. However, the autocratic node 106 does not forward or relay timing-related and startup-related frames that are sourced from the plurality of end nodes 102.

In the particular embodiment shown in FIG. 1, the autocratic node 106 comprises protocol logic 108 that implements a portion of the FlexRay protocol. The autocratic node 106 also comprises a local clock 110 that is used to establish the master time base. The autocratic node 106 imposes its master time base on the cluster 100 by sourcing synchronization protocol frames in accordance with that master time base. Since the autocratic node 106 dictates what the master time base is, the autocratic node 106 need not perform the FlexRay clock synchronization specified in the FlexRay specification. That is, the protocol logic 108 establishes the master time base without regard to any timing-related frames sourced from any of the plurality of end nodes 102.

Similarly since the autocratic node 106 sources all of the protocol integration and startup frames communicated in the cluster 100, the autocratic node 106 does not need to implement the complicated FlexRay start-up and integration protocol functionality; once again this behavior is dictated by the master time-line dictated by the autocratic node 106.

The cluster 100 is configured such that all cold-start and synchronization frames are sourced from the autocratic node 106. Such a strategy therefore inherently reduces the degree of protocol interdependency and coupling between the autocratic node 106 and the COTS FlexRay end nodes 102.

Figure 2:
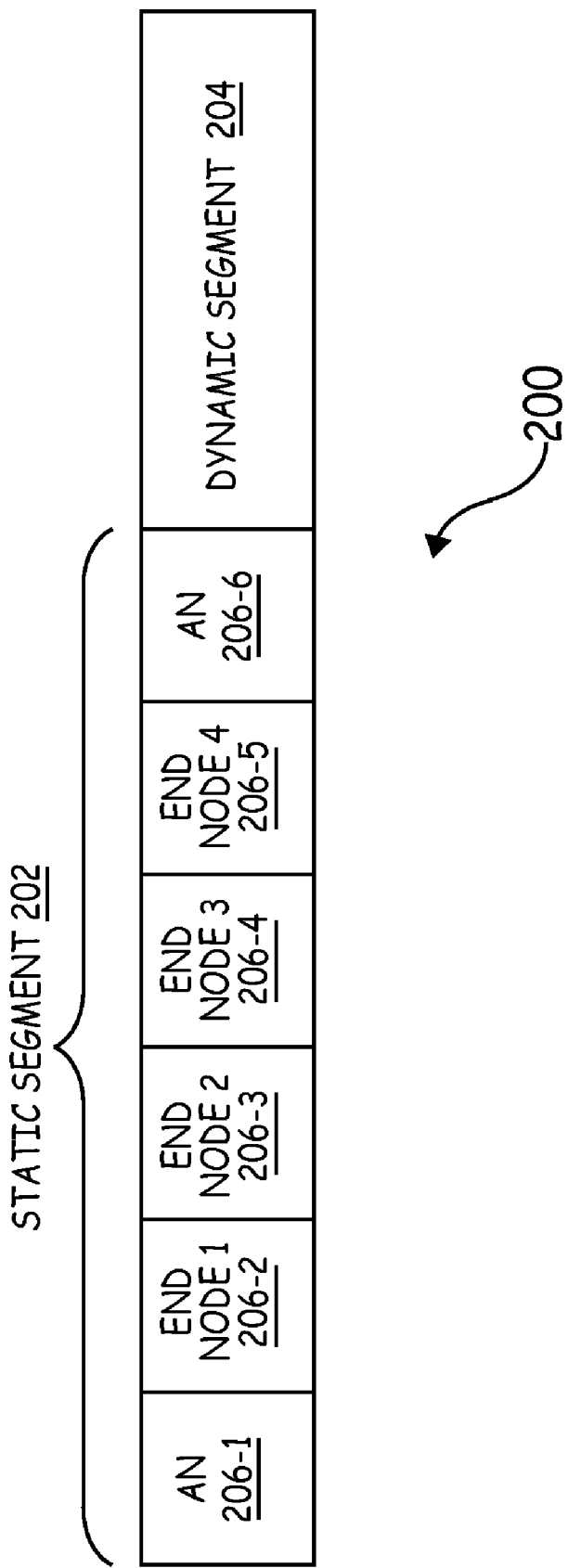
FIG. 2 illustrates one example of a schedule used in the embodiment of FIG. 1.

One example of a schedule 200 used in such an embodiment is shown in FIG. 2. The exemplary schedule 200 comprises a FlexRay communication cycle, which for each round, specifies a static segment 202 and a dynamic segment 204. A TDMA access scheme is used during the static segment 202. The static segment 202 in this example comprises a plurality of time slots 206 (individually labeled as 206-1, 206-2, 206-3, 206-4, 206-5, and 206-6). Each of the end nodes 102 is assigned at least one time slot 206 in which to transmit. Also, as shown in FIG. 2, a minimum of two TDMA time slots 206-1 and 206-4 are assigned to the autocratic node 106 for transmitting cold-start and synchronization frames. During the dynamic segment 204, a mini-slot access method is used to provide the end nodes 102 with dynamic access to the communication channel. As described below, the autocratic node 106 may be used to implement rate-based enforcement in those implementations and embodiments where fairness guarantees are to be provided during the dynamic segment 204.

The autocratic node 106, during each time slot 206 of the schedule 200, either transmits particular frames (for example, synchronization or integration frames) that are sourced from the autocratic node 106 itself or forwards valid frames received from a particular end node 102 that is scheduled to transmit during the current time slot 206. In embodiments where semantic filtering is supported and cut-through switching is used to forward frames, the autocratic node 106, when forwarding frames received from a scheduled end node 102, truncates such forwarding if the synchronization frame indicator bit or startup frame indicator bit is set. Truncation of the frame makes the frame detectably incorrect at receiving end nodes 102. Semantic filtering may also be extended to incorporate the checking and enforcement of other protocol frame information such as frame ID. Since this information is dependent on the timeline as sourced from the autocratic node 106, the data used for enforcement comparison may be simply incorporated into the schedule table 114 (described below) of the autocratic node 106.

In one simple implementation of the embodiment shown in FIG. 1, the protocol logic 108 is implemented in a low-complexity manner using a state machine 112 (for example, using a programmable device, application-specific integrated circuit, or other suitable implementation technique) and a table 114 (implemented, for example, using a suitable volatile or non-volatile memory such as content-addressable memory (CAM) memory devices) in which a FlexRay communication schedule for the cluster 100 is stored. The schedule stored in the table 114 specifies which end nodes 102 are scheduled to transmit at each time slot within a given FlexRay communication round. The state machine 112 uses the time base established by the local clock 110 to determine the current position in the schedule stored in the table 114 and what actions the autocratic node 106 should take for that time slot. In other words, the internal message processing and relaying of the autocratic node 106 can be implemented in this way using very simple, table-driven timed operations (for example, by using counter to step through the schedule).

Figure 3:
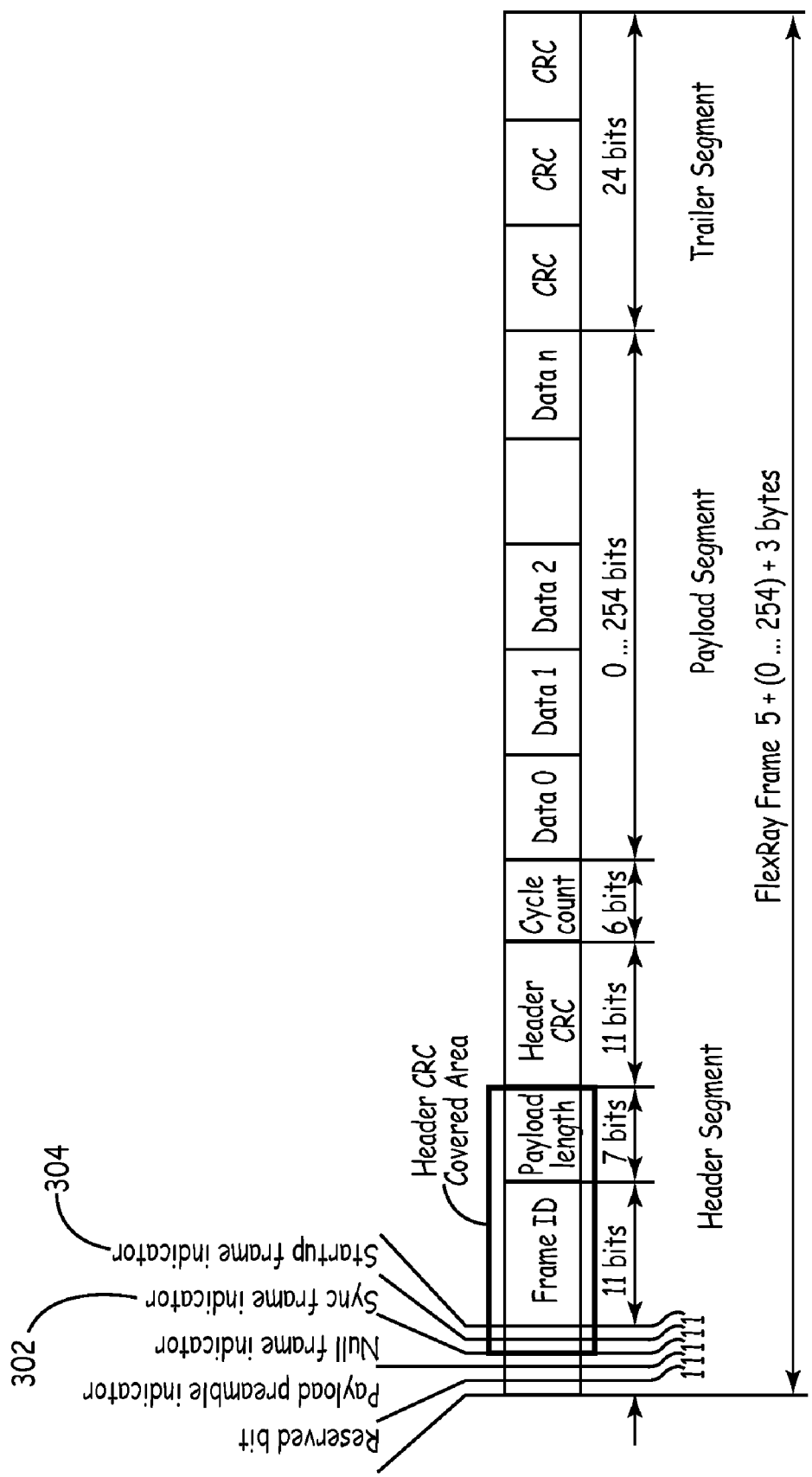
FIG. 3 is a block diagram illustrating the FlexRay frame format.

Since by configuration the autocratic node 106 is the only source of the protocol cold-start and synchronization frames, the autocratic node 106 can contain protocol failure by simply filtering the state of the cold-start and sync bits of all frames that are relayed by the COTS end node 102. This is a kind of "dumb" frame-level enforcement. The format of FlexRay frames is illustrated in FIG. 3. As shown in FIG. 3, the FlexRay frame format contains a sync frame indicator bit 302 and a startup frame indicator bit 304. If the autocratic node 106 receives a frame sourced from a COTS FlexRay end node 102 containing an erroneously set sync or cold-start bit, the autocratic node 106 simply truncates the frame and does not relay that frame to the other COTS FlexRay end nodes 102. Since the FlexRay protocol qualifies static frame identifiers (IDs) in relation to the TDMA time line, semantic filtering of frame IDs may not be required in the autocratic node 106 in some implementation. This further simplifies the "guardian function" realization in the autocratic node 106 and associated latent fault scrubbing.

Moreover, in those implementations where fairness guarantees are to be provided during the dynamic segment 204 of each FlexRay communication cycle 200, for each otherwise valid frame received from an end node 102 during the dynamic segment 204, the autocratic node 106 checks if that end node 102 has already transmitted more than its fair share. This check may be implemented using "fair share" information that is stored in the table 114 (or other memory) and may be specified in a variety of ways (for example, on a cycle-by-cycle basis and/or across multiple FlexRay communication cycles).

In one simple implementation of such an embodiment, the autocratic node 106 does not need to "listen" to any of the frames sourced from the COTS FlexRay end nodes 102 in connection with establishing the master time line for the cluster 100. That is, the autocratic node 106 only forwards such frames it receives from the COTS FlexRay end nodes 102 in accordance with the TDMA schedule and/or performs the semantic filtering as described above but does not otherwise process such received frames. Hence, during certification of such an embodiment, it is easier to establish noninterference guarantees, despite the complexities of the underlying FlexRay protocol logic. Similarly, in such an embodiment, the autocratic node 106 does not need to maintain protocol state to perform protocol protection.

In one implementation of the embodiment shown in FIG. 1, the autocratic node 106 forwards each valid frame received from one of the COTS FlexRay end nodes 102 to all of the other COTS FlexRay end nodes 102. In other implementations of the embodiment shown in FIG. 1, the autocratic node 106 forwards each valid frame received from one of the COTS FlexRay end nodes 102 to a subset of the other COTS FlexRay end nodes 102. In one such alternative implementation, the COTS FlexRay end nodes 102 to which the autocratic node 106 forwards a particular valid frame is determined (at least in part) by information stored in the table 114. For example, the schedule stored in the table 114 can specify, for each time slot, the COTS FlexRay end nodes 102 that are permitted to transmit during that time slot and to which end nodes 102 the autocratic node 106 is to forward valid frames transmitted by those scheduled end nodes 102. Thus, it is possible to schedule multiple, simultaneous multi-cast groups. In other such implementations, the COTS FlexRay end nodes 102 to which the autocratic node 106 forwards a particular valid frame is determined (at least in part) by information included in the valid frame. Moreover, it is to be understood that the forwarding performed by the autocratic node 106 can be implemented using cut-through switching and/or store-and-forward switching.

In the embodiment shown in FIG. 1, the time base that the autocratic node 106 uses to create the startup, integration, and synchronization frames that it sources is derived only from a local clock 108 (or other source of clock information) resident at the autocratic node 106.

Figure 4:
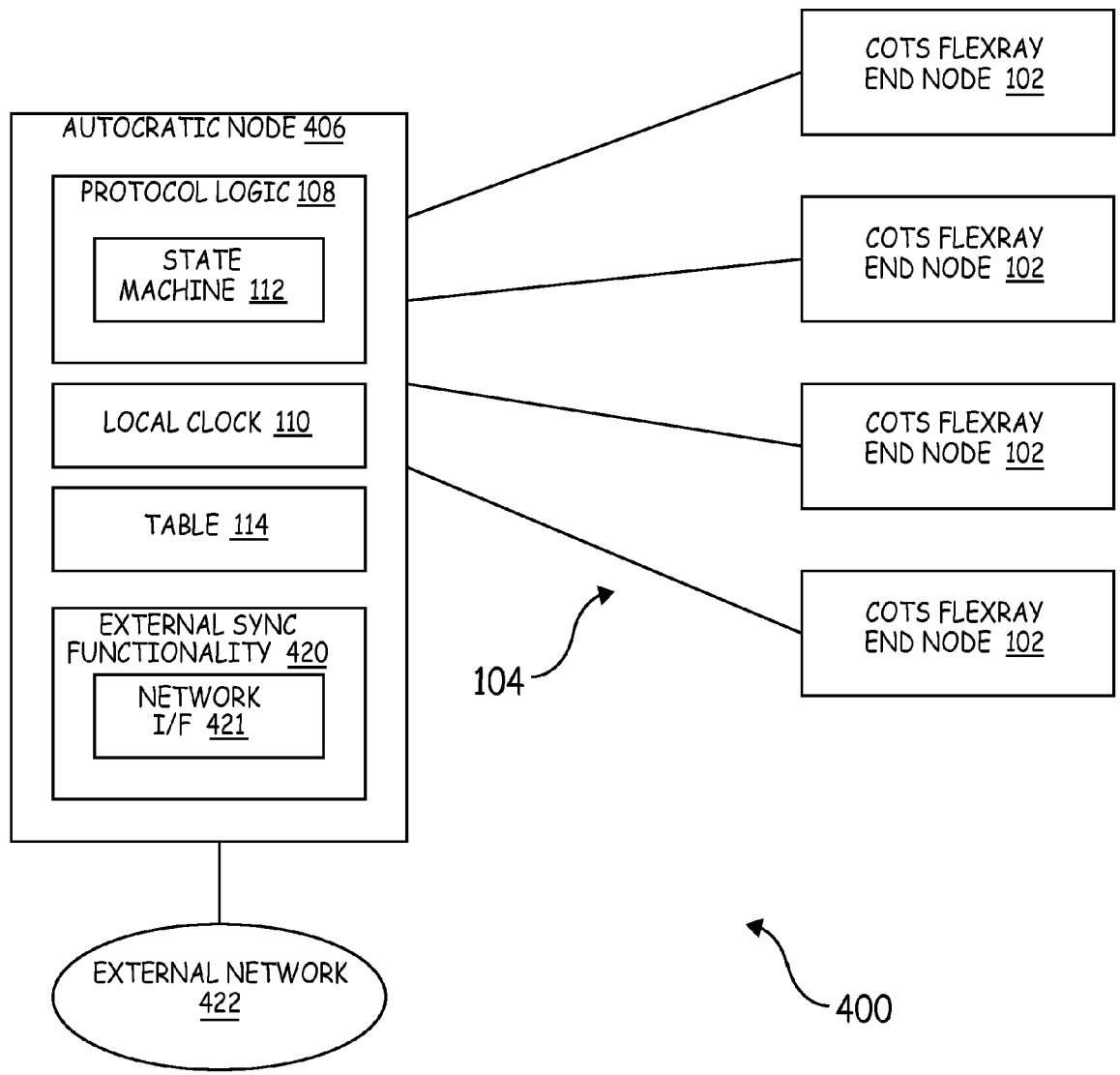
FIG. 4 is a block diagram of one embodiment of a cluster 400 in which an autocratic node is synchronized to an external time base.

FIG. 4 is a block diagram of one embodiment of a cluster 400 of end nodes 102. The cluster 400 of FIG. 4 is the same as FIG. 1 except as set forth below. Those portions of the cluster 400 that are the same as the cluster 100 of FIG. 1 are referenced in FIG. 4 using the same reference numeral as in FIG. 1 and the descriptions such portions are not repeated here in relation to FIG. 4. The cluster 400 comprises an autocratic node 406 that is the same as the autocratic node 106 of FIG. 1 described above except that the autocratic node 406 comprises external synchronization functionality 420 that is used to synchronize the time base of the autocratic node 106 to an external time base. As with the autocratic node 106, the autocratic node 406 uses the time base to create the startup, integration, and synchronization frames, which, as described above in connection with FIG. 1, dictates a master time base to the end nodes 102 of the cluster 400. In the particular embodiment shown in FIG. 4, the external time base is the time base of another network 422 to which the autocratic node 406 is communicatively coupled via an appropriate network interface 421. For example, in one implementation of such an embodiment, the other network 422 comprises a network that supports one or more of the Avionics Full-Duplex Switched Ethernet (AVDX)/ARINC 664 network protocol, one or more of the Institute of Electrical and Electronics Engineers (IEEE) 802.3 collection of standards (also referred to here as "ETHERNET"), the SAFEbus™ data bus developed by Honeywell International Inc., and the TTP™/C data bus developed by TTTech Computertechnik AG, or derivatives thereof. In other embodiments, the autocratic node 406 synchronizes itself to other external time bases such as the time base provided by the Global Positioning System (GPS). In some implementations or embodiments where the autocratic node 406 is designed to synchronize itself to an external time base, the autocratic node 406 also comprises a local time monitor or watchdog 424 to provide a time base in the event that the autocratic node 406 is unable to synchronize itself to the external time base.

The external synchronization functionality 420 and local time monitor 422 can be implemented, for example, using one or more programmable devices, application-specific integrated circuits, or other suitable implementation technology and can be integrated (or not) with one or more of the protocol logic 108, local clock 110, and the table 114.

The techniques described here can be used, for example, to provide synchronization to an external time base, lower certification risk and overhead, and a differentiator to an integrated modulator avionics (IMA) supplier where such techniques are used with off-the-shelf COTS protocol silicon.

This simplicity of the embedded autocratic node and reduced protocol logic may also assist self-checking implementations to be realized (timing masters). Also since the autocratic node 106 controls FlexRay timeline message processing, higher order functions (for example, a message relaying function of a gateway) can be greatly simplified. A chief advantage is that this scheme enables COTS FlexRay modules to be used within a critical network infrastructure where separation and fault-tolerance is required.

Figure 5:
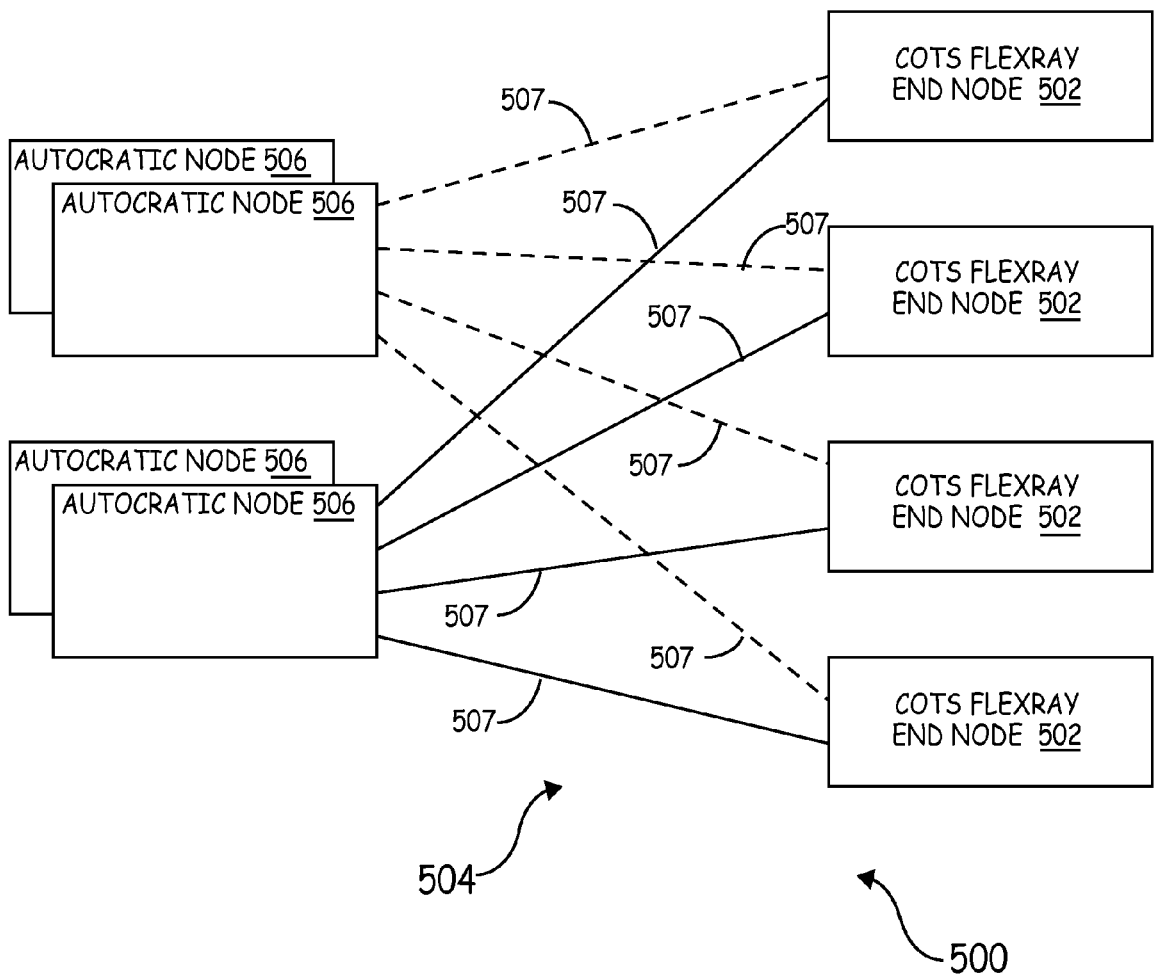
FIG. 5 is a block diagram of an embodiment of a cluster having multiple autocratic nodes.

In the embodiment shown in FIG. 1, a single autocratic node 106 and a single communication channel 104 is used for fail-stop operation. However, in other embodiments, multiple autocratic nodes 106 (or derivatives thereof) can be used, for example, for fail-operational functionality. FIG. 5 is a high-level diagram of one embodiment of such an embodiment. As shown in FIG. 5, a cluster 500 comprises a plurality of end nodes 502 that communicative with one another over a two logical communication channels 504 (one of which is illustrated using solid lines and the other using dashed lines).

For each logical communication channel 504, a self-checking pair 505 serves as a logical internetworking device that couples the end nodes 502 to one another via that logical communication channel 504. Each self-checking pair 505 implemented using a pair of autocratic nodes 506. Each logical communication channel 504 is implemented using point-to-point communication links that couple each end node 502 to respective ports of the autocratic nodes 506 that make up the self-checking pair 505 using a suitable physical communication medium or media (for example, using metallic or optical communication media). In the particular embodiment shown in FIG. 5, a pair of interlink communication links 507 communicatively couple the two self-checking pairs 505 of FIG. 5.

Figure 6:
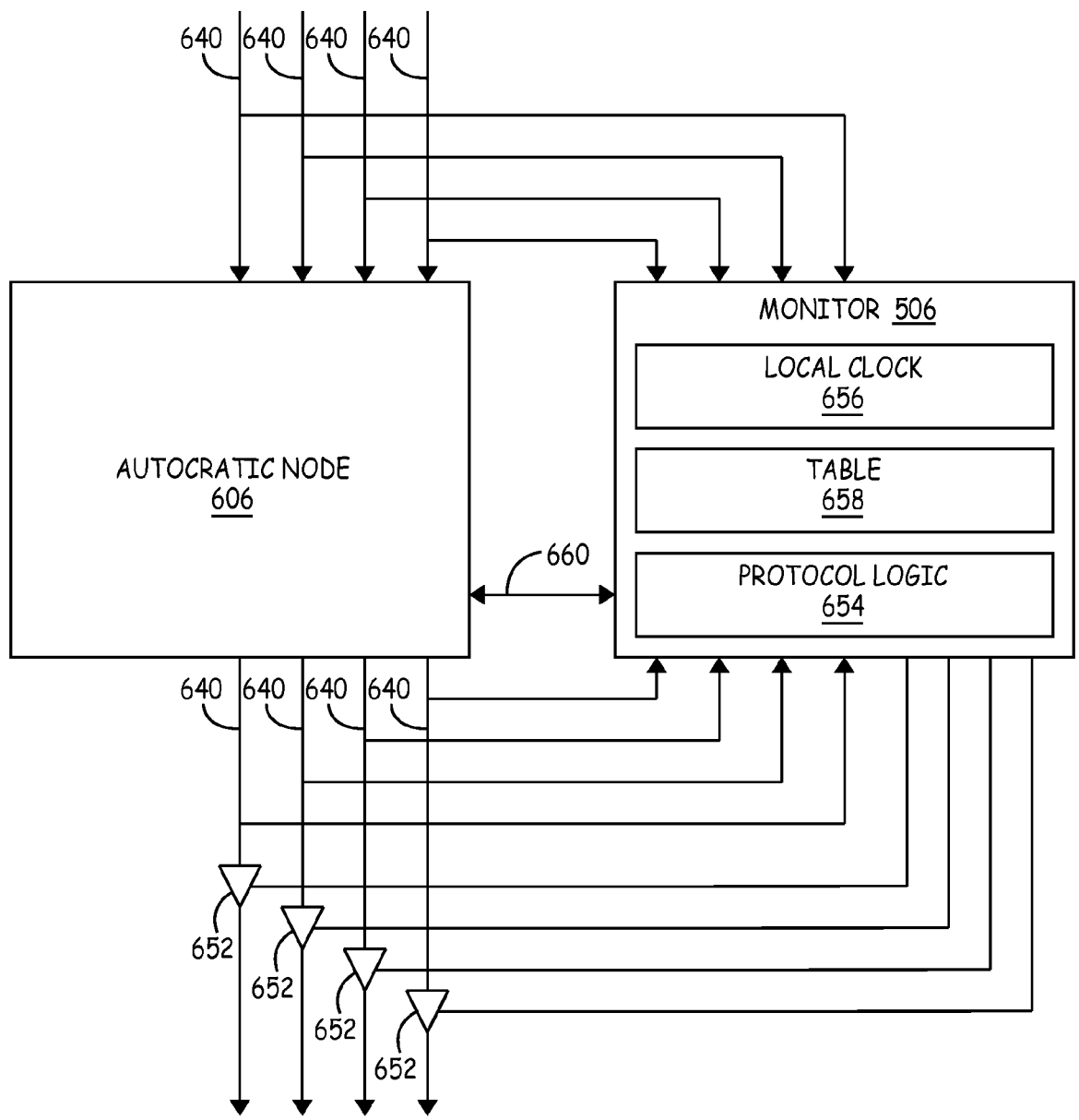
FIG. 6 is a block diagram of one embodiment of a self-checking pair suitable for use in the embodiment shown in FIG. 5.

FIG. 6 is a block diagram of one embodiment of a self-checking pair 600 suitable for use in the embodiment shown in FIG. 5. In the embodiment shown in FIG. 6, a "COM/MON" self-checking pair scheme is used in which an autocratic node 606 that is substantially similar to autocratic nodes 106 and 406 described above in connection with FIGS. 1-4 are used. For the purposes of clarity, in FIG. 6, each point-to-point link that couples the autocratic node 606 to an end node 102 is shown in two parts—an inbound link 640 on which frames are received at the autocratic node 606 from a respective end node 102 and an outbound link 642 over which frames are communicated from autocratic node 606 to the respective end node 102. The self-checking pair 600 also comprises a monitor 650 that is coupled to the inbound links 640 and the outbound links 642 of the autocratic node 606 to monitor the inbound links 640 and the outbound links 642. The monitor 650 is also coupled to the transmit driver 652 for each of the outbound links 642 of the autocratic node 606. In the event that the monitor 650 determines that the autocratic node 606 is improperly forwarding or transmitting a frame on a particular outbound link 642, the monitor 650 de-asserts a transmit enable signal that causes the transmit driver 652 to stop transmitting or forwarding that frame, thereby causing the frame to be truncated. Such truncation prevents that frame from being successfully received at the end node 102 coupled to that outbound link 642.

The monitor 650 is implemented in a low-complexity manner similar to that of the autocratic node 606. The monitor 650 comprises protocol logic 654, a table 656, and a local clock 658. An interlink 660 couples the monitor 650 and the autocratic node 606 so that the monitor 650 may synchronize itself to the autocratic node 606 on power up and to align itself to the master time line of the autocratic node 606. The schedule for the cluster 600 is stored in the table 656. The protocol logic 654 can be implemented using a simple state machine 662. The state machine 662 is driven by the schedule stored in the table 656 and confirms that the protocol logic (not shown in FIG. 6) of the autocratic node 606 is correctly relaying and sourcing frames as described above.

As noted above, in the event that the monitor 650 determines that the autocratic node 606 is improperly forwarding or transmitting a frame on a particular outbound link 642, the monitor 650 de-asserts the transmit enable signal for that link 642 that causes the transmit driver 652 for that link 642 to stop transmitting or forwarding that frame.

Figure 7:
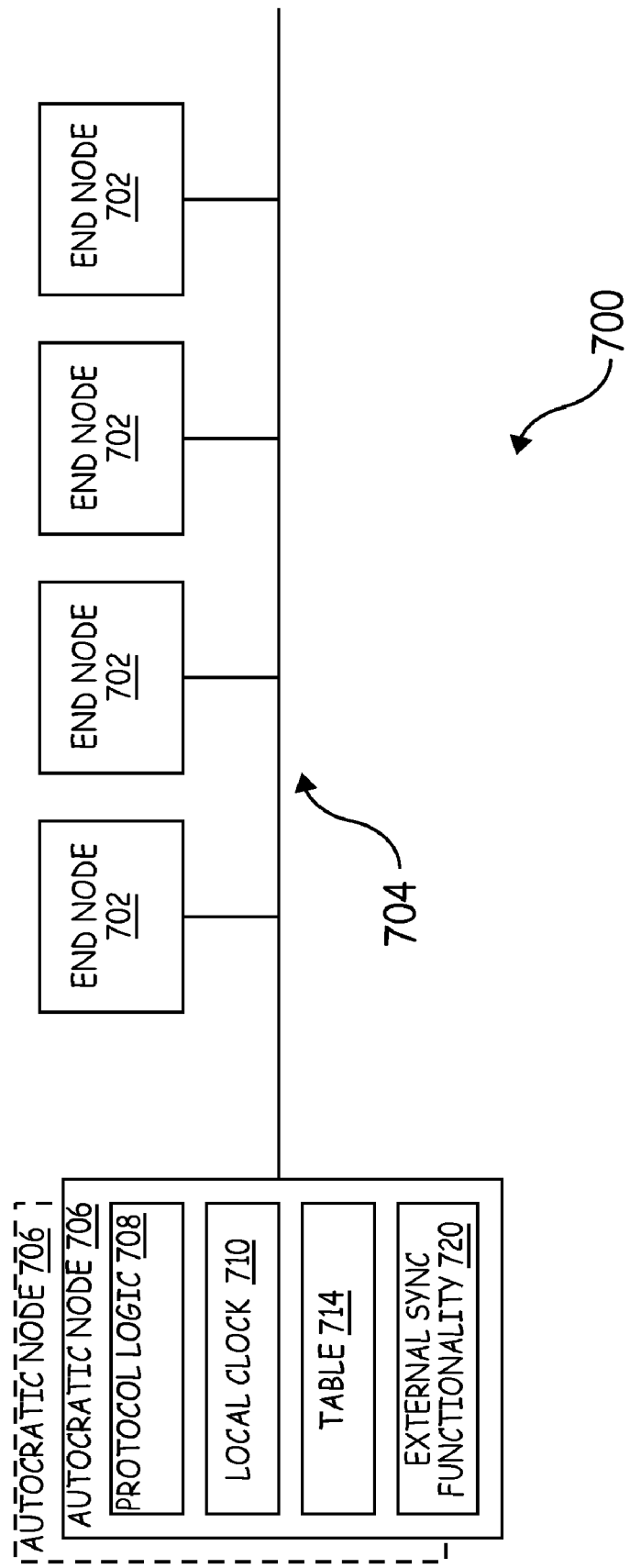
FIG. 7 is a block diagram of one embodiment of cluster of COTS FlexRay end nodes in which a logical communication channel is implemented using a bus or peer-to-peer topology.

As noted above, the autocratic node described herein can be used in other network topologies. FIG. 7 is a block diagram of one embodiment of cluster 700 of COTS FlexRay end nodes 702 in which a logical communication channel 704 is implemented using a bus or peer-to-peer topology. One or more autocratic nodes 706 are used in the cluster 700 of FIG. 7. In such an embodiment, the cluster 700 is configured so that all synchronization or startup or integration frames are validly sourced from only the one or more autocratic nodes 706. The autocratic node 706 comprises protocol logic 708, local clock 710, and a table 714. In such an embodiment, the protocol logic 708 implements a portion of the FlexRay protocol that enables the autocratic node 706 to source startup, integration, and synchronization frames in order to dictate the master time line for the cluster 700. Since the autocratic node 706 dictates what the master time base is, the autocratic node 706 need not perform the FlexRay clock synchronization specified in the FlexRay specification. In one implementation, the master time line that the autocratic node 706 establishes is based on its local clock 710. In another implementation, the autocratic node 706 comprises external synchronization functionality 720 of the type described above in connection with FIG. 4 that synchronizes the master time line used by the autocratic node 706 to an external time base (for example, an external time base used by another network).

Figure 8:
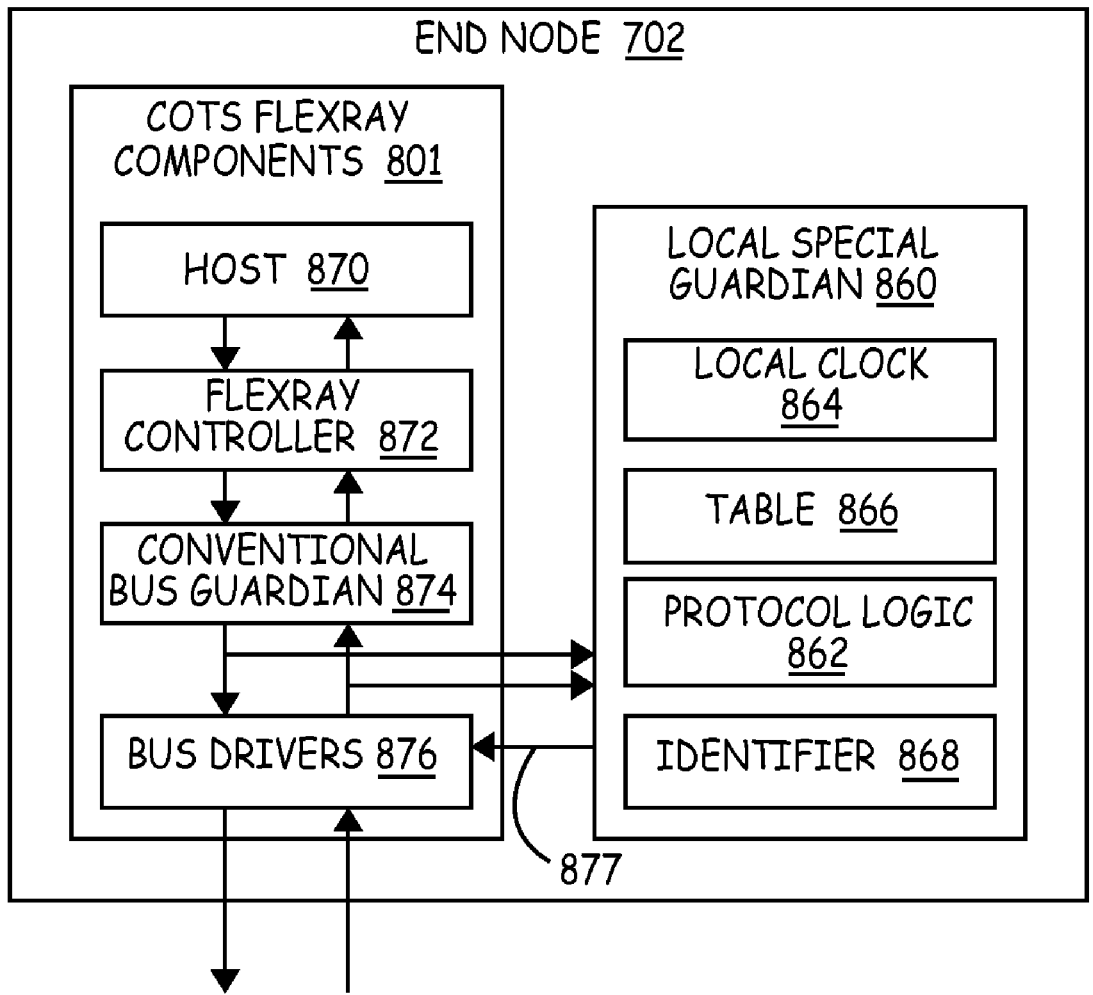
FIG. 8 is a block diagram of one embodiment of local bus guardian functionality suitable for use with the embodiment of FIG. 7.

When an autocratic node 706 of FIG. 7 is used in a cluster 700, special local guardian functionality 860 can be used at each of the end nodes 702. FIG. 8 is a block diagram of one embodiment of an end node 702 that includes special local bus guardian functionality 860. In this embodiment, the special local bus guardian functionality 860 (also referred to here as the "special local bus guardian" or "special guardian") is implemented in a low-complexity manner. The special local bus guardian functionality 860 comprises protocol logic 862, a local clock 864, a table 866, and an identifier 868. The end node 702 comprises COTS FlexRay components 801 of the type that are used to implement the end nodes 702 described above.

More specifically, the COTS FlexRay components 801 comprise a host 870 that executes application software that provides and uses the data that is communicated over the cluster 700. The host 870 communicates with the other end nodes 102 in the cluster 700 using a FlexRay protocol communication controller 872 that implements FlexRay protocol logic (for example, FlexRay timing control, clock synchronization, and startup, error, and message handling). The COTS FlexRay end node 702 also typically comprises one or more bus drivers 874 that couples the FlexRay communication controller 872 to the communication media that is used to implement the one or more communication channels 704 to which the end node 702 is coupled. The bus driver 874 does not permit data to be transmitted from the FlexRay communication controller 872 onto the communication channel 704 or data to be received at the FlexRay communication controller 872 from the communication channel 704 unless a bus driver enable signal 877 is asserted. Moreover, the end node 702 also comprises one or more conventional internal FlexRay bus guardians 876 that monitor data that is transmitted on the communication channels 704 and only permits the end node 702 to transmit on the communication channel 704 during those time slots in which the end node 702 is scheduled to transmit in a conventional manner.

In a similar manner as the central autocratic guardians 106 and 406 of FIGS. 1 and 4, the special local bus guardian functionality 860 performs semantic filtering of all frames transmitted from the end node 702 that is coupled to the special local bus guardian functionality 860. Any such transmitted frames that have synchronization or cold-start bits set are truncated by the special local bus guardian functionality 860 by immediately disabling the bus driver 874 forcing an invalid frame by de-asserting the bus driver enable signal 877. Hence, the special local bus guardian functionality prevents the end nodes 702 from interfering with the FlexRay synchronization and start up operation in the cluster 700. More generally, the special local bus guardian functionality 860 steps through the schedule to determine the current time slot, compares the frame identifiers of any received frames, and truncates any frames that have a frame identifier that is different from the frame identifier specified in the schedule for the current time slot by de-asserting the bus driver enable signal 877.

In a preferred embodiment, the cluster 700 includes a fail-passive self-checking pair (similar the self-checking pair of FIG. 6) that sources start-up and synchronization frames. The special local bus guardian functionality 860 synchronizes to the FlexRay timeline dictated by the self-checking pair in a simple master/slave fashion. The protocol logic 862 of the special local bus guardian functionality 860 uses the received start-up and sync frames to align its local schedule (using the local clock 864 and table 866). Thus, the guardian functionality 860 does not need to implement the more complex FlexRay integration procedure.

Once synchronized to the FlexRay timeline, the local guardian functionality 860 enforces compliance to the FlexRay communication schedule by only enabling the bus driver 874 when the respective end node 702 is scheduled to transmit. For example during time slots that are assigned to that end node 702 and during the dynamic segment. The special local bus guardian functionality 860 prevents the end node 702 from sending until it is synchronized by de-asserting the bus driver enable signal 877. That is, after power up, the special local bus guardian functionality 860 blocks the local end node 702 from sending until the special local bus guardian functionality 860 is synchronized to the autocratic node 706 in that cluster 700. To implement this enforcement, the special local bus guardian functionality 860 requires knowledge of the FlexRay communication cycle parameters, for example length of static and dynamic segments, slot length, and which slot/slot(s) are assigned to the respective end node 702, which it stores in table 866. This required configuration information may be supplied locally, for example via a SPI connection to a local host computer, a local read-only memory or remotely via the designated FlexRay payloads (as described below).

The special local bus guardian functionality 860 ensures that the respective end node 702 only sends in the time slots assign to that end node 702 (according to the schedule information). In the preferred embodiment, the special local bus guardian functionality 860 only enables the bus driver 874 for time slots where the respective end node 702 is scheduled to send as specified by the supplied schedule information. In another embodiment, if the respective end node 702 were to transmit outside of its scheduled slot, the special local bus guardian functionality 860 detects this and, by disabling the bus driver 874, causes the transmitted frame to be truncated, which results in an invalid frame at all the receiving nodes 702 in the cluster 700. As indicated earlier all frames that leave the special local bus guardian functionality 860 are semantically filtered to prevent the erroneous propagation of start-up and synchronization protocol frames. Optionally, increased semantic filtering (for example, filtering for frame identifier correctness, etc.) may also be performed by the special local bus guardian functionality 860.

In another embodiment, the information required for the special local bus guardian functionality 860 to perform schedule enforcement may be sourced via the synchronization and start-up frames that the special local bus guardian functionality 860 uses for integration. For example, the schedule slot (time slot 206-1 in FIG. 2) contains schedule information. In a preferred embodiment, the guardian configuration data is sourced in the data portion of the frames sourced by the "fail-passive" autocratic nodes 706 (that is, frames with the cold-start and sync flags bits set), that are implemented in a self-checking configuration. The configuration data supplied in such frames includes the information required for schedule enforcement (that is, the length of static and dynamic segments, slot length, and which slot/slot(s) are assigned to the end node 702, current slot position and length of dynamic segment, etc.). Since the payload of such frames incorporates the configuration data required for all end nodes 702 in the cluster 700, the special local bus guardian functionality 860 uses a locally assigned guardian identifier 868 (which is supplied locally (for example via pin strapping or from read only storage) to identify which bytes of the configuration data are assigned to that special local bus guardian 860. Since this information is sourced from a fail-passive autocratic node 706, the special local bus guardian functionality 860 may accept and trust the information as sourced.

Alternatively the special local bus guardian functionality 860 may confirm the configuration by checking the same data from multiple time slots. Such schemes may remove the need for the special local bus guardian functionality 860 to calculate payload CRC's since the data may be confirmed by performing a bit-for-bit comparison of multiple transmissions. Redundant coding within a single payload may also be used.

It is to be understood that the simplified local guardian functionality can be used in FlexRay networks that include one or more low complexity autocratic nodes as described here and in FlexRay networks that do not include one or more low complexity autocratic node as described herein.

In one embodiment, the techniques, devices, and methods described herein are implemented so as to support the FlexRay Protocol Specification V2.1 Rev. A and Protocol Specification V2.1. Rev. A Errata V1, which is incorporated herein by reference in its entirety. It is to be understood that, although the techniques, devices, and methods described have been described in connection with particular embodiments that support the FlexRay protocol, these techniques, devices, and methods can be used with other protocols and the innovation described shall not necessarily be construed as limited to use with the FlexRay protocol. For example, these techniques, devices, and methods can be used with other distributed time-triggered protocols.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

The invention claimed is:

1. An autocratic node comprising:
an interface to communicatively couple the autocratic node to a communication channel over which a plurality of end nodes communicate; and
protocol functionality to establish a time base to use in communicating with the plurality of end nodes and to source timing-related frames to the plurality of end nodes in accordance with a distributed time-triggered protocol;
wherein the protocol functionality establishes the time base without regard to any timing-related frame sourced from any of the plurality of end nodes;
wherein the autocratic node is coupled to a second autocratic node to form a self-checking pair configured to confirm that the protocol functionality is sourcing the timing-related frames in accordance with the distributed time-triggered protocol.

2. The node of claim 1, wherein the protocol functionality sources startup-related frames to the plurality of end nodes in accordance with the distributed time-triggered communication protocol.

3. The node of claim 2, wherein the interface comprises a plurality of ports, each of the plurality of ports to communicatively couple a respective one of the plurality of end nodes to the node and wherein the node forwards validly received frames from the plurality of end nodes to a subset of the plurality of end nodes.

4. The node of claim 3, wherein the protocol functionality does not forward startup-related frames received from the plurality of end nodes.

5. The node of claim 3, wherein the protocol functionality performs at least one of semantic filtering and rate enforcement.

6. The node of claim 1, wherein the interface communicatively couples the node to a communication channel implemented using a bus or peer-to-peer topology.

7. The node of claim 1, wherein the protocol functionality does not implement functionality to adjust the time base based on timing-related frames sourced from any of the plurality of end nodes and wherein the protocol functionality is implemented an low-complexity manner.

8. The node of claim 1, further comprising a local clock and a table to store a schedule, and wherein the protocol functionality comprises a state machine that is used to establish the time base using, at least in part, the local clock and to source timing-related frames in accordance with the schedule.

9. The node of claim 1, wherein the distributed time-triggered protocol comprises the FlexRay protocol.

10. The node of claim 1, further comprising external synchronization logic to synchronize the time base of the node to an external time base.

11. A cluster comprising:
a plurality of end nodes that communicate with one another over at least one communication channel using a distributed time-triggered communication protocol;
a self-checking pair of special nodes that communicates with the plurality of end nodes over the communication channel, wherein the self-checking pair of special nodes comprises protocol functionality to establish a time base to use in communicating with the plurality of end nodes and to source timing-related frames to the plurality of end nodes in accordance with the distributed time-triggered communication protocol;
wherein the protocol functionality establishes the time base without regard to any timing-related frame sourced from any of the plurality of end nodes;
wherein the cluster comprises a star network topology in which the self-checking pair of special nodes communicatively couples the end nodes to one another, wherein the self-checking pair of special nodes forwards validly received frames from the plurality of end nodes to a subset of the plurality of end nodes, wherein the self-checking pair of special nodes further comprises guardian functionality to truncate timing-related frames sourced from the plurality of end nodes; and wherein the self-checking pair of special nodes performs at least one of semantic filtering and rate enforcement.

12. The cluster of claim 11, wherein the protocol functionality sources startup-related frames to the plurality of end nodes in accordance with the distributed time-triggered communication protocol.

13. The cluster of claim 12, wherein the protocol functionality does not forward startup-related frames received from the plurality of end nodes.

14. The cluster of claim 12, wherein the cluster comprises at least one of a bus topology and peer-to-peer topology, wherein each of the plurality of end nodes is communicatively coupled to the communication channel using a respective special local bus guardian, wherein each special local bus guardian prevents the respective end node from successfully transmitting at least one of timing-related frames and startup-related frames.

15. The cluster of claim 12, wherein the self-checking pair sources startup-related frames.

16. The cluster of claim 11, wherein the end nodes comprise commercial off the shelf FlexRay end nodes.

17. The cluster of claim 11, wherein the special node comprises external synchronization logic to synchronize the time base of the node to an external time base.

18. The cluster of claim 17, wherein the external time base comprises a time base of an external network.

19. A node comprising
a distributed time-triggered communication protocol controller;
a bus driver to communicatively couple distributed time-triggered communication protocol controller to a communication channel; and
local guardian functionality to enforce a schedule using an established time base;
wherein the local guardian functionality comprises functionality that enforces the schedule by counting a current time slot of the schedule and comparing frame identifiers of received frames with information from the schedule;
wherein the local guardian functionality also performs semantic filtering by truncating timing-related frames and startup-related frames that are sourced from a node other than a node that is designated as the source of synchronization and/or startup frames.

20. The node of claim 19, wherein the local guardian functionality receives the schedule information.

21. The node of claim 20, wherein the simple local guardian functionality receives the schedule information from a special node.

22. The node of claim 19, further comprising an identifier used by the local guardian functionality in comparing frame identifiers of received frames to schedule information.

23. A node comprising:
a distributed time-triggered communication protocol controller;
a bus driver to communicatively couple distributed time-triggered communication protocol controller to a communication channel; and
simple local guardian functionality that performs semantic filtering by truncating at least one of timing-related frames and startup-related frames that are sourced from a node other than a special node that is designated as the source of synchronization and/or startup frames.

24. The node of claim 23, wherein the simple local guardian functionality enforces a schedule using an established time base.

* * * * *